United States Patent [19]  [11] Patent Number: 4,998,399
Lutzke et al.  [45] Date of Patent: Mar. 12, 1991

[54] PET BOTTLE PACKER

[75] Inventors: Wayne S. Lutzke, Plymouth; Michael A. Balz, Kiel, both of Wis.

[73] Assignee: Nigrelli Systems, Inc., Kiel, Wis.

[21] Appl. No.: 306,561

[22] Filed: Feb. 6, 1989

[51] Int. Cl.$^5$ .................. B65B 21/06; B65B 35/44
[52] U.S. Cl. ........................ 53/398; 53/251; 53/448; 53/534; 53/543; 198/419.3
[58] Field of Search ............ 53/48, 251, 398, 448, 53/534, 543, 580, 246, 531; 198/419.3, 461

[56] References Cited

U.S. PATENT DOCUMENTS

| 2,978,854 | 4/1961 | Fairest | 53/534 X |
| 3,190,434 | 6/1965 | Dardaine | 198/419.3 |
| 3,553,927 | 1/1971 | Anglade, Jr. | 53/539 X |
| 3,805,476 | 4/1974 | Kawamura et al. | 53/448 |
| 3,872,647 | 3/1975 | Langen et al. | 198/419.3 |
| 4,041,677 | 8/1977 | Reid | 53/543 |
| 4,093,063 | 6/1978 | Calvert et al. | 198/419.3 |
| 4,098,392 | 7/1978 | Greene | 198/419.3 |
| 4,531,345 | 7/1985 | Nigrelli et al. | 53/534 |
| 4,541,524 | 9/1985 | McGill et al. | 53/534 X |

Primary Examiner—Robert L. Spruill
Assistant Examiner—Linda B. Johnson
Attorney, Agent, or Firm—Fuller, Ryan & Hohenfeldt

[57] ABSTRACT

A packer is especially useful for loading PET bottles into open top cases. The bottles are fed at a predetermined speed along an infeed path. An overhead pusher bar system contains vertically oriented bars that descend vertically between selected bottles at a penetration station to form the bottles into complements of the desired number. Vertical penetration is accompanied by horizontal motion of the bars as they travel in a curved path at the penetration station. The horizontal speed of the bottles at the penetration station is temporarily slowed as the bars descend between adjacent bottles. Horizontal bottle slowing is accomplished by pivoting a downstream bar to a horizontal orientation at a pivot station such that the bar acquires leading and trailing edges. The pivoting trailing edge forces the bottles upstream therefrom in the upstream direction relative to the continuous steady speed of the bar downstream end. Bar pivoting creates correct spacing between consecutive complements.

19 Claims, 4 Drawing Sheets

PET BOTTLE PACKER

BACKGROUND OF THE INVENTION

1. Field of the Invention

This invention pertains to article handling, and more particularly to apparatus for loading articles into containers.

2. Description of the Prior Art

Various kinds of machinery have been developed to load articles into containers. A particularly important application of article loading concerns the loading of plastic beverage bottles into open top containers. Handling filled thin-wall plastic bottles, commonly referred to as PET bottles, is a difficult task. The filled bottles are heavy and unstable. The thin flexible walls make the bottles very pliable and resilient, so they tend to bounce around when contacted by handling equipment or other bottles. In short, PET bottles are difficult to control.

U.S. Pat. No. 4,531,345 describes a case loader that reliably loads open top containers with complements of PET bottles on a high speed basis. It has been found desirable to incorporate the mechanisms for forming the complements directly into the container loading apparatus.

U.S. Pat. No. 4,531,345 describes article handling apparatus that includes an article grouper in the form of chains and lugs that travel in generally horizontal planes. While the grouper of the U.S. Pat. No. 4,531,345 patent is generally satisfactory, it requires somewhat more time than is desirable to convert the system to handle bottles of different sizes.

Thus, a need exists for improved machinery for grouping articles and loading them into open containers.

SUMMARY OF THE INVENTION

In accordance with the present invention, an article packer is provided that groups a quantity of articles into complements of the desired number and loads the complements into open top containers. This is accomplished by apparatus that includes a pusher bar system that continuously separates the articles into complements and propels the complements toward the associated containers.

The articles are fed in a downstream direction along an infeed path to the pusher bar system. Feeding of the articles may be by a conventional infeed conveyor. The articles fed along the infeed path may be separated into as many parallel columns as desired.

The pusher bar system comprises a pair of transversely spaced chains that are trained over respective sprockets for traveling in respective vertical planes. The chains travel continuously. The travel of the lower flight of the chains is in the downstream direction. The infeed conveyor is faster than the chains. Supported by the chains are a series of consecutively spaced pusher bar assemblies. Each pusher bar assembly comprises a pusher bar that extends across the article path. Pivotally connected to the opposite ends of each pusher bar are a pair of pivot arms that ride in respective tracks in the article packer frame. Supported by and extending between each pivot arm is a shaft. The shaft in turn supports one or more generally hour glass shaped rollers. The hour glass rollers have peripheries that closely match the exterior contours of the articles. The location of the lower or downstream flight of the chains, pusher bars, pivot arms, and shafts is approximately at mid-height of the articles fed by the infeed conveyors. The chain upper or upstream flight is above the articles.

The upstream end of the pusher bar system is designed such that each pusher bar assembly travels in a path having vertical and horizontal components of motion as the pusher bar assembly makes the transition to the lower, downstream chain flight from the upper, upstream chain flight. As the pusher bar assembly approaches the downstream chain flight, its motion combines downward and downstream motions. The travel of the pusher bar assemblies is further designed such that they consecutively enter between the necks of different sets of adjacent articles while undergoing the combined downward and downstream motions. As a pusher bar assembly enters between the articles, its pusher bar, pivot arm, and shaft with hour glass rollers are generally vertically aligned, with the pusher bar being under the shaft. At that point, the downstream speed of the articles in the horizontal direction as propelled by the infeed conveyor is greater than the horizontal component of speed of the pusher bar assembly. Continued steady motion of the chains and articles would cause the adjacent upstream or trailing article in the infeed path to overtake the pusher bar. The upper portion of the trailing article would strike the adjacent downstream pusher bar and be tipped backwardly in the upstream direction. Such action would also cause the other articles upstream of the pusher bar assembly to tip backwardly and possibly fall over, thereby interrupting the complement forming process.

To enable the pusher bars to successfully penetrate between adjacent articles to separate them into complements, the horizontal motion of the articles is slowed momentarily. Article slowing is timed such that relative horizontal motion between the articles and the pusher bars is eliminated or at least greatly reduced as the pusher bars descend between adjacent articles. Elimination or reduction of relative horizontal motion is achieved by slowing the speed of the articles to approximately the horizontal component of speed of a pusher bar as it travels with combined vertical and horizontal motion toward the chains' lower flight. Consequently, the pusher bar has only vertical motion relative to the articles, and can penetrate vertically between the sides of adjacent articles without causing a tipping problem. As a result of the pusher bar penetration between adjacent articles, a trailing and a leading article are created relative to the pusher bar. After the pusher bar has penetrated between the vertical sides of adjacent articles and approaches the chains' downstream flight, the articles acquire the horizontal speed of the pusher bar.

To slow the horizontal speed of the articles as a pusher bar enters between two adjacent articles, the present invention utilizes the pivot arms that are pivotally connected to the respective pusher bars. As mentioned, the pivot arm of each pusher bar assembly is vertically oriented, with the shaft vertically above the associated pusher bar, as the pusher bar penetrates between adjacent articles. The pusher bar penetrates between the adjacent articles a sufficient distance such that the shaft and hour glass rollers also penetrate between the articles. At that point, a complement of articles is created downstream of the pusher bar. The pusher bar then takes over from the infeed conveyor to propel the complement of articles downstream. At the same time, vertical support for the articles is transferred to a flat bottom plate underlying the articles.

Continued motion of the pusher bar system chains causes the vertically aligned pusher bars, shafts, and hour glass rollers to travel in the downstream direction along the chains lower flight for a short distance. Then the pivot arms strike respective stationary cams that cause the pivot arms to pivot upstream relative to the associated pivot bar and toward a generally horizontal attitude with the pusher bar. The chains and pusher bars continue to move downstream at a constant speed, but the horizontal component of motion of the shafts and hour glass rollers slow considerably or may even stop relative to the associated pusher bar speed. As a consequence, the adjacent upstream or trailing article is also slowed relative to the chains and pusher bar speed. The cams and pusher bar assemblies are designed such that the pivot arms strike the cams to slow the upstream articles just as the next consecutive upstream pusher bar assembly enters between another set of adjacent articles upstream of the cams for penetrating between the upstream adjacent articles to form another complement. With the pivot arms pivoted by the cams to the horizontal attitude relative to the associated pusher bar, the rollers and pusher bar of each pusher bar assembly space consecutive complements a correct distance apart so as to match the containers in which the complements are to be loaded.

To load the complements into the open top containers, support for the articles is transferred from the flat bottom plate to a slotted hanger plate. The slotted hanger plate generally overlies the articles, but it underlies flanges formed near the tops of the articles. The complements propelled by the respective pusher bar assemblies pass along the hanger plates, with the articles suspended by their flanges. A container supply system propels open top containers along a path that underlies and intersects the path of the suspended articles. The timing of the container supply system and pusher bar system is such that a complement of articles is deposited into a container as the complement and container paths intersect. With the complements in the containers, the filled containers are propelled further downstream for inspection and shipping.

Other objects, advantages and features of the invention will become apparent to those skilled in the art upon reading the disclosure.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figures 1, 2, 3:
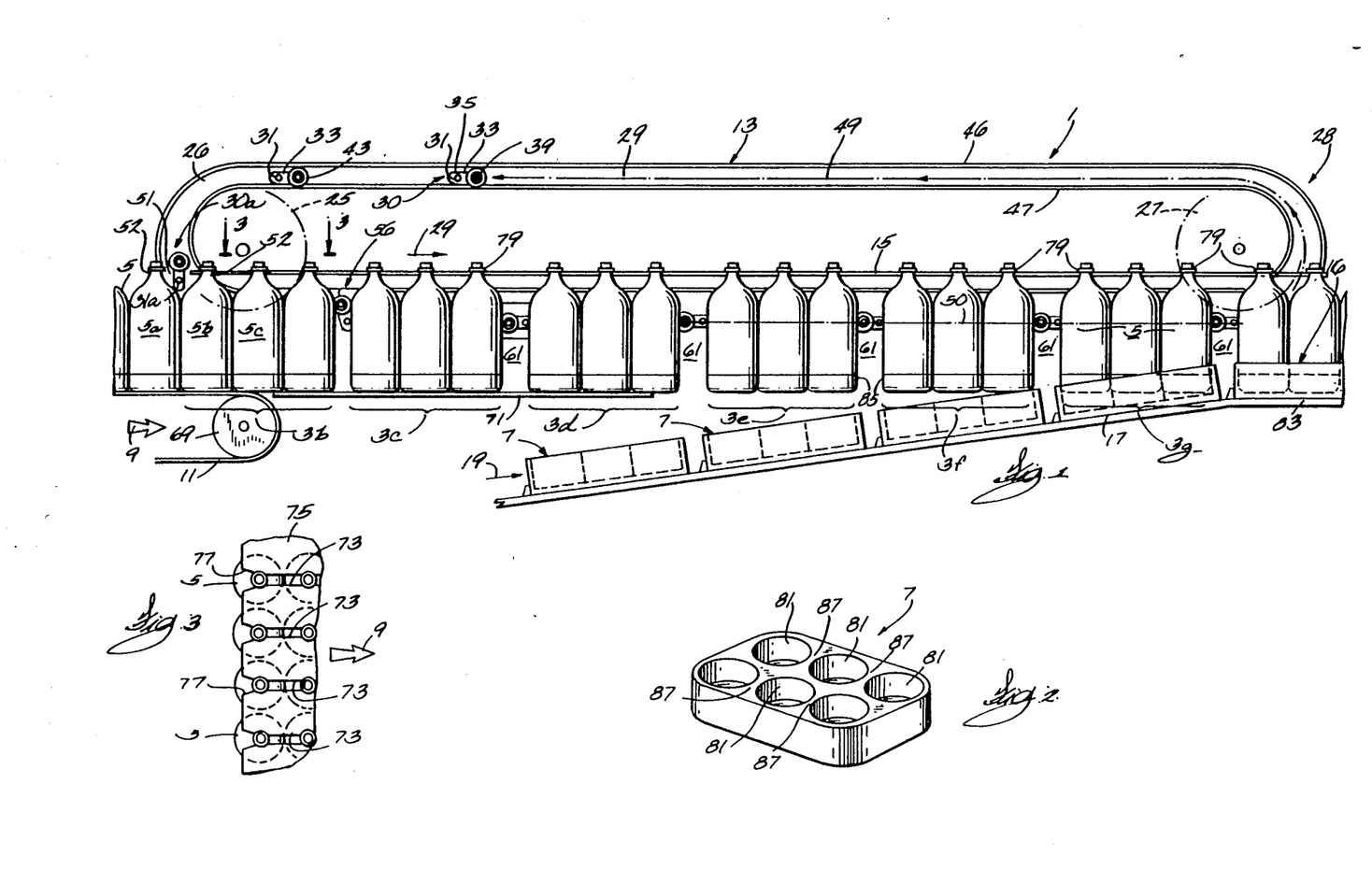
FIG. 1 is a side view of the article packer of the present invention.
FIG. 2 is a perspective view of an open top container into which complements of articles are loaded.
FIG. 3 is a view taken along lines 3—3 of FIG. 1.

Referring to FIG. 1, complement forming and loading apparatus 1 is illustrated that includes the present invention. The apparatus 1 is particularly useful for forming complements 3 of articles 5 from a quantity of articles and for packing the complements into open top containers 7. The particular articles 5 shown are bottles made from polyethylene terepthalate and commonly called PET bottles in the trade. However, it will be understood that the invention is not limited to use with that specific type of article.

GENERAL

Figure 6:
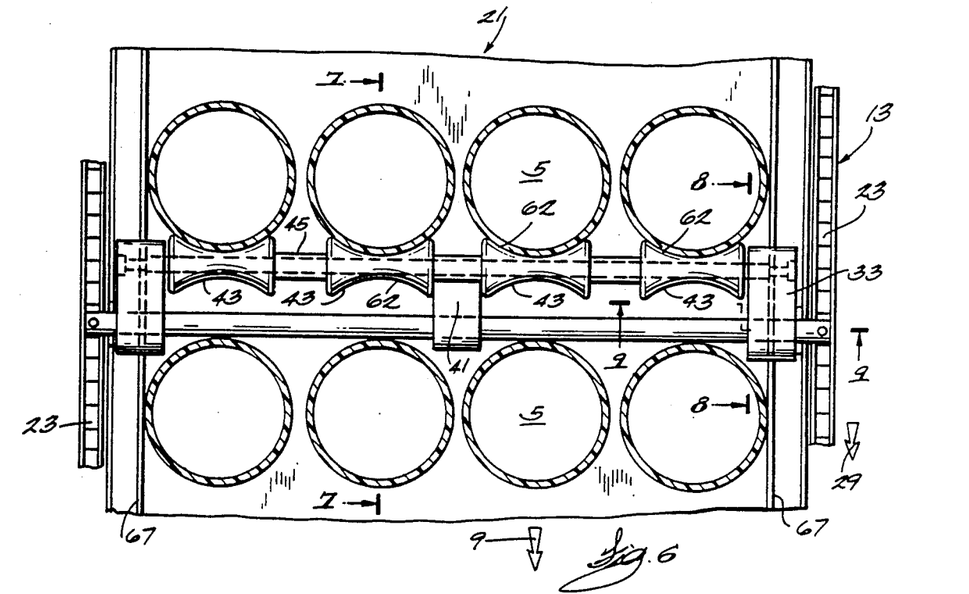
FIG. 6 is an enlarged cross sectional view taken along lines 6—6 of FIG. 5c and rotated 90° clockwise.

A quantity of massed articles such as PET bottles 5 is fed continuously along the apparatus 1 in a downstream direction, as indicated by arrow 9, by a constant speed infeed conveyor 11. Looking also at FIG. 6, the bottles 5 are fed along an infeed path 21 in the downstream direction 9. The infeed path 21 in FIG. 6 is shown as containing four columns of bottles, but more or fewer columns are possible.

The bottles 5 are grouped into complements 3 by an overhead pusher bar system 13. The pusher bar system 13 also propels the complements downstream of the conveyor 11, with the bottles suspended by a slotted hanger plate 15.

Simultaneously, a second conveyor 17 carries the open top containers 7 in the direction of arrow 19 along a path that intercepts the complements 3. The containers rise to nest over and support the lower portions of the bottles 5. The bottles then pass beyond the supporting hanger plate 15. The filled containers 16 are carried further downstream by a conveyor portion 83 for additional handling.

PUSHER BAR SYSTEM

The pusher bar system 13 performs the double task of grouping the massed columns of bottles 5 into the complements 3 and of propelling the complements in the downstream direction 9 to the corresponding containers 7. For those purposes, the pusher bar system comprises a pair of transversely spaced and aligned chains 23 trained around respective tail sprockets 25 and head sprockets 27. The chains 23 thus have an upstream end 26 and a downstream end 28. Power is supplied continuously at a constant speed to the head sprocket 27 by a conventional drive mechanism, not shown, to drive the chains in the direction of arrows 29. The linear speed of the chains 23 is less than the linear speed of the conveyor 11. The chains 23 straddle the bottles along the infeed path 21. The lower flights 50 of the chains are about at mid-height of the bottles.

Figure 8:
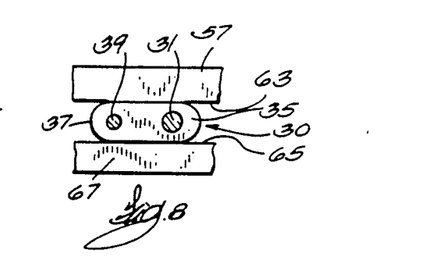
FIG. 8 is a cross sectional view taken along lines 8—8 of FIG. 6 and rotated 90° counterclockwise.

Connected to the chains 23 by appropriate links are a series of consecutively spaced pusher bar assemblies 30. Each pusher bar assembly 30 comprises a pusher bar 31 that extends across the bottle path 21. Pivotally connected to each end of the pusher bar is a pivot arm 33. Looking also at FIG. 8, each pivot arm 33 preferably has a generally obround cross section, with the pusher bar being pivotally connected near one end 35 thereof.

Supported in the second end 37 of each pivot arm 33 is a shaft 39 that also extends across the bottle path. A spacer 41 may be used to connect the pusher bar to the shaft 39 near their respective mid-points, FIG. 6.

Rotatably received in each shaft 39 are a series of hour glass shaped spools or rollers 43. As many hour glass rollers 43 are used as there are columns of bottles 5 along the infeed path 21. The hour glass rollers are spaced on the shaft 39 by spacers 45.

Figure 4:
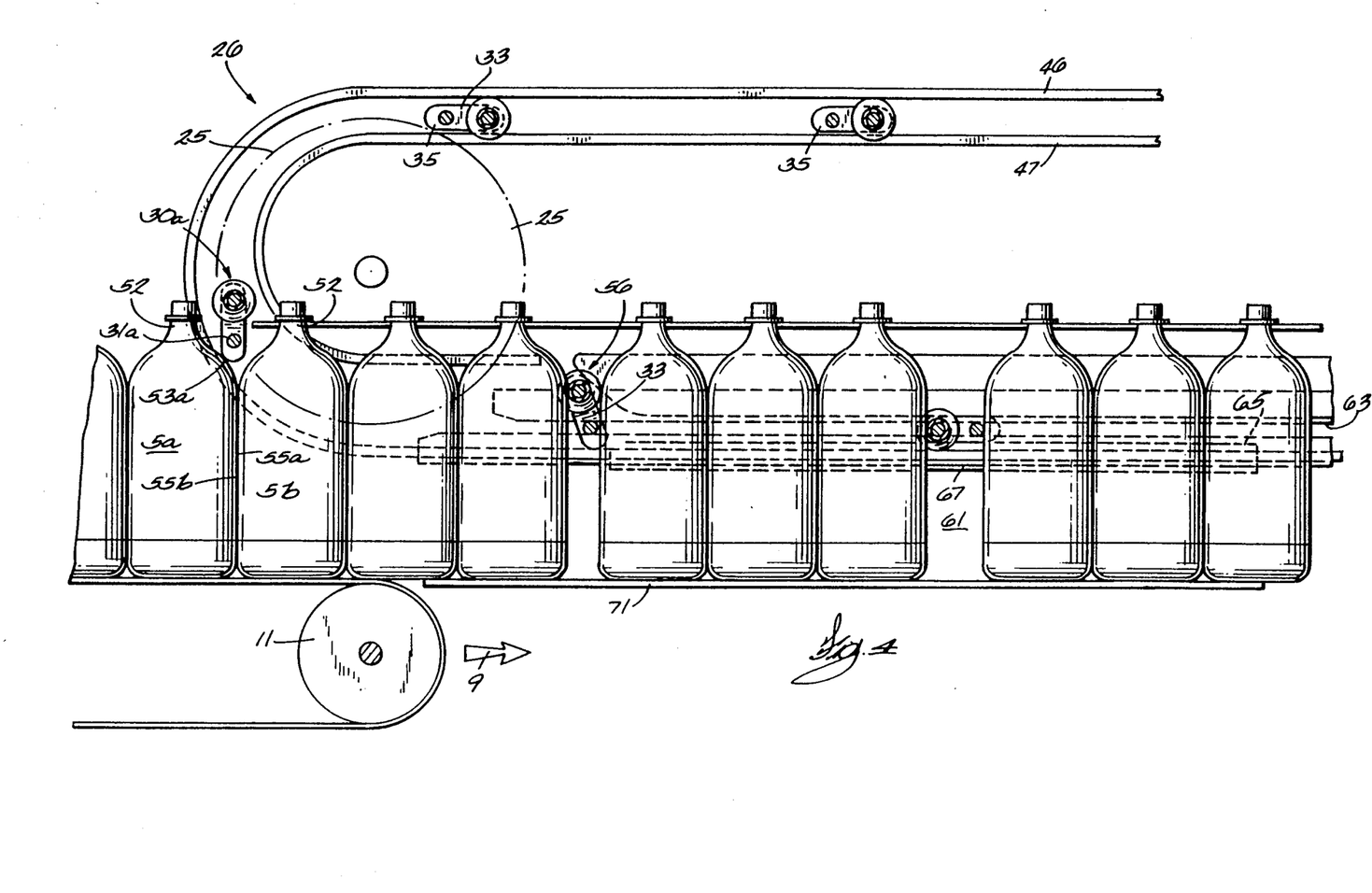
FIG. 4 is an enlarged side view of the upstream end of the article packer of the present invention.

Guide plates 46 and 47 loosely guide the hour glass rollers 43 and shafts 39 in locations wherein they are generally horizontal with and trail the associated pusher bars 31 along the chains upper flight 49, FIG. 1. Consequently, during operation the pivot arm end 35 is the leading end, and the end 37 is the trailing end. As the pusher bar assemblies 30 round the system tail sprockets 25, the pivot arms 33 attain generally vertical orientations, with the shafts 39 and hour glass rollers 43 being generally vertical above the associated pusher bars 31. The guide plates 46 and 47 diverge in the downstream direction at the tail sprocket 25, as is best shown in FIG. 4. Consequently, the pusher bar assemblies remain vertically oriented as they pass around the tail sprocket.

As the pusher bar assembly 30a travels in the curved path around the tail sprocket 25, it approaches a penetration station 54 and enters between the necks 52 of two adjacent bottles 5a and 5b. At that point, the horizontal component of speed of the pusher bar 31a in the downstream direction 9 is less than the horizontal speed of the conveyor 11 and of the bottles. Consequently, the shoulder 53a of the adjacent trailing or upstream bottle 5a has a tendency to overtake, strike, and be restrained by the pusher bar 31a. The normal result would be for the pusher bar 31a to cause the bottle shoulder 53a to tip backwardly upstream, and thereby tend to cause all the bottles upstream of the pusher bar assembly 30a to tip backwardly. However, by a mechanism to be described shortly, the horizontal speed of the bottles at the penetration station 54 is slowed momentarily, which allows the pusher bar 31a to enter between the vertical sides 55a and 55b of the adjacent bottles 5a and 5b, respectively, without causing bottle tipping.

Figure 5A:
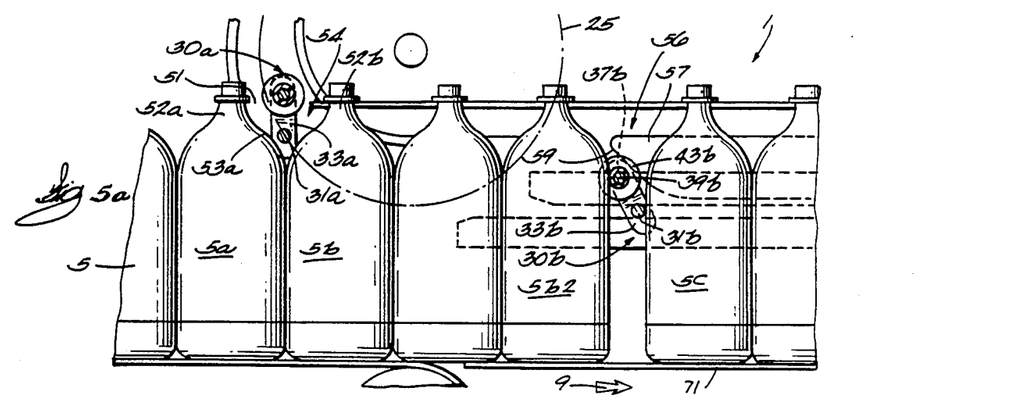
FIGS. 5a–5c are enlarged views of the upstream end of the article packer showing the sequence of operations employed to form complements of articles according to the present invention.
Figure 5B:
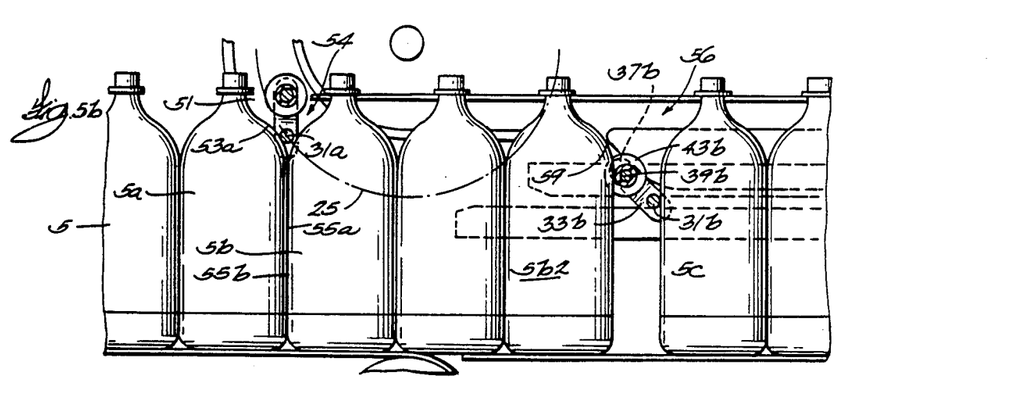
Figure 5C:
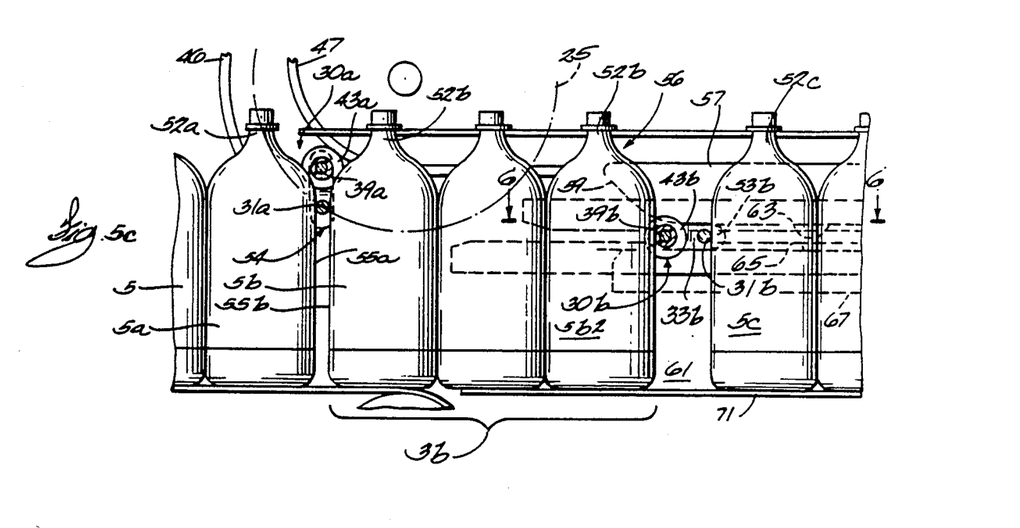

Now turning to FIGS. 5a-5c, the pusher bar assembly 30a is shown as it follows the tail sprocket 25 toward adjacent bottles 5a and 5b. As the pusher bar 31a enters the space 51 between the necks 52a and 52b of the adjacent bottles 5a and 5b, respectively, the horizontal component of motion of the bottles 5a and 5b in the downstream direction 9 is slowed to approximately the speed of the horizontal component of motion of the pusher bar 31a. Consequently, when the pusher bar 31a and the bottles are in their respective locations as shown in FIG. 5b, the continuing movement of the pusher bar 31a along the curved path defined by the tail sprocket 25 and the downstream motion of the bottles as propelled by the conveyor 11 produce only generally vertical relative motion between the pusher bar and the bottles. The pusher bar 31a thus penetrates vertically relative to the vertical surfaces 55a and 55b of the bottles 5a and 5b, respectively. As a result, the tendency of the pusher bar 31a to tip the bottle 5a and the bottles upstream therefrom is greatly reduced or even eliminated. The penetration of the pusher bar 31a continues until the shaft 39a and hour glass rollers 43a also are between the bottles 5a and 5b.

The mechanism employed to slow the bottles at the penetration station 54 will now be described. As mentioned, the guide plates 46 and 47 for the pusher bar assembly pivot arms 33 and hour glass rollers 43 diverge in the direction 29 in the vicinity of the tail sprocket 25. See FIG. 4. Such divergence permits the pusher arms and hour glass rollers to remain vertically oriented when the pusher bar assemblies force their way between the adjacent bottles at the penetration station. Thus, the pusher bar assembly 30a remains in a vertical orientation during the completion of its travel around the tail sprocket, including the portion of its travel after it has penetrated between the bottles 5a and 5b, FIG. 5c. The pusher bar assembly 30a remains in the vertical orientation for a short distance downstream from the tail sprocket 25.

Downstream a short distance from the penetration station 54 is a pivot station 56. At the pivot station 56, a pair of stationary cams 57 are attached to the frame of the article packer 1. The cams 57 have respective upstream surfaces 59 that are located so as to be struck by the trailing ends 37 of the pivot arms 33 as those components are propelled downstream by the chains 23. As best shown in FIG. 5a, each cam surface 59 is located such that it is struck by a pivot arm 33b of the next consecutive downstream pusher bar assembly 30b just as the next consecutive upstream or trailing pusher bar assembly 30a enters the space 51 between the bottles 5a and 5b at the penetration station 54. Continued steady motion downstream of the pusher bar 31b under the action of the chains causes the pivot arm trailing ends 37b to pivot about the pusher bar 31b in an upstream direction relative thereto. Such pivoting causes the shaft 39b and hour glass rollers 43b to force the adjacent trailing bottle 5b2, together with all the bottles upstream from trailing bottle 5b2, including bottles 5a and 5b, backwardly upstream relative to the position of the pusher bar 31b. The cam surfaces 59 are designed to slow the horizontal speed of the bottles upstream of the pusher bar assembly 30b to approximately the same speed as the horizontal component of speed of the pusher bar 30a at the penetration station. Consequently, the next consecutive upstream pusher bar assembly 30a is able to penetrate between adjacent bottles 5a and 5b without striking the shoulder 53a and causing attendant backward tipping of the upstream bottles. The entry of the upstream pusher bar assembly 30a between the adjacent bottles 5a and 5b after the next consecutive downstream pusher bar assembly 30b had entered between the bottles 5b2 and 5c forms the bottle complements, such as complement 3b, FIG. 5c.

Looking also at FIG. 6, the hour glass rollers 43 have respective peripheries 62 that closely conform to the exteriors of the bottles 5. As a result, as a pusher bar assembly, such as pusher bar assembly 30a of FIGS. 5a-5c, penetrate between adjacent bottles, the hour glass rollers slide easily down the bottle vertical surfaces 55. Similarly, when the pivot arms 33 strike the cam surfaces 59 to pivot the hour glass rollers toward the horizontal attitude of pivot arm 33b of FIGS. 5c and 6, the rollers roll along the bottle surfaces 55 without damaging the bottle labels.

Figure 7:
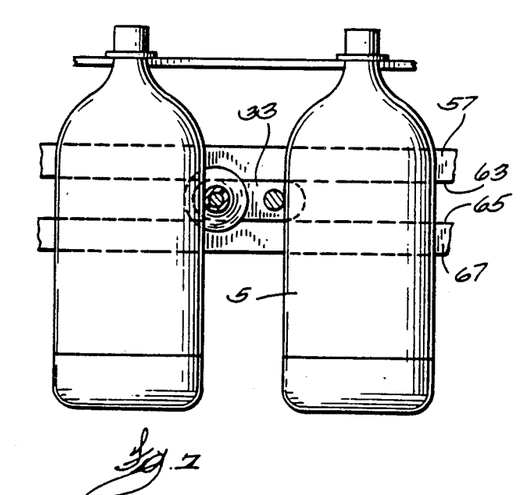
FIG. 7 is a cross sectional view taken along lines 7—7 of FIG. 6 and rotated 90° counterclockwise.
Figure 9:
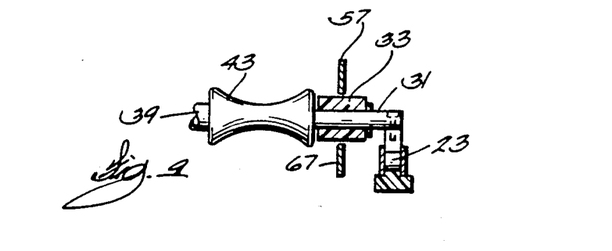
FIG. 9 is a cross sectional view taken along lines 9—9 of FIG. 6.

Ultimately, as best shown in FIG. 5c, the pivot arms 33b of the pusher bar assembly 30b pass the downstream end of the cam surfaces 59. At that point the pivot arms are horizontal, with the pivot arm leading ends 35b reestablished. The pusher bar 31b and they cooperate to create a space 61 between the bottles 5c and 5b2. The pivot arms 33 are retained in the horizontal attitude downstream of the cam surfaces 59 by vertically spaced surfaces 63 and 65 on the cams 57 and on second guide plates 67, respectively. Also see FIGS. 7-9.

The conveyor 11 ends at conveyor roller 69 at a location generally under the tail sprocket 25. At that point, propulsion of the bottles 5 in the downstream direction 9 is transferred from the conveyor 11 to the pusher bar system 13. The pusher bars 31, such as pusher bar 31a, that enter between the bottles 5a and 5b under the tail sprocket 25 propel the bottles downstream onto a bottom support plate 71. As the bottles are transferred from the conveyor 11 to the support plate 71, the bottle necks 52 enter into slots 73 of the hanger plate 15. To guide the bottles into the slots 73, the upstream ends of the slots are formed with funnel-like openings 77, as is best shown in FIG. 3.

Now looking at FIG. 1, the support plate 71 ends downstream from the end conveyor roller 69 a distance sufficient to support the bottles 5 until the complements thereof, such as complement 3d, are fully formed, with the full spacings 61 present adjacent complements. Then the support plate 71 terminates. Support of the bottles is transferred from the support plate to the hanger plate 15. The bottles are suspended from the hanger plate by respective neck flanges 79, which have diameters greater than the width of the hanger plate slots 73. Consequently, complements downstream of the support plate 71, such as complement 3e, are entirely accessible from underneath.

CONTAINER CONVEYOR

Traveling in timed relation with the pusher bar system 13 is the angled conveyor 17 that supplies the containers 7 to be loaded with the complements 3. The containers 7 are best described in connection with FIG. 2. FIG. 2 shows a container having six pockets 81, but more or fewer pockets are possible, depending on the number of bottles 5 in the complements 3. Although not specifically shown in FIG. 1, two containers 7 are placed in side-by-side relation on the conveyor 17 so as to accommodate the four columns of bottles in the bottle infeed path 21 (FIG. 6).

The containers 7 placed on the conveyor 17 are vertically aligned with the respective complements 3 of the pusher bar system 13. The containers are propelled by the conveyor 17 in the direction of arrow 19 to rise under the associated complements. The round bottom corners 85 of the bottles enable the bottles to nest within the respective container pockets 81 even thought the pockets are spaced by walls 87 and the walls 55 of the adjacent bottles in the complements are in contact with each other. At the top end 83 of the conveyor 17, the containers have fully received and support the bottles. The containers lift the bottle flanges 79 out of contact with the hanger plate 15. The pusher bar system 13 terminates at the head sprocket 27, and the filled containers 16 are propelled further downstream by the conveyor section 83.

Without further description, it is thought that the advantages to be gained from the disclosed embodiment of the present invention will be apparent to those skilled in the art. Furthermore, it is contemplated that various modifications and alterations may be made to the article packer of the present invention within the scope of the appended claims without departing from the spirit of the invention. Accordingly, it is intended to include all such modifications and alterations to the present invention within the spirit and broad scope of the appended claims.

I claim:
1. A packer for loading articles having neck flanges into open top containers comprising:
   a. infeed means for propelling the articles at a predetermined speed in a downstream direction along an article path;
   b. pusher bar means for penetrating between selected adjacent articles in the article path to separate the articles into complements of the desired number and to propel the complements in the downstream direction, and for temporarily slowing the downstream speed of the selected adjacent articles relative to the predetermined speed during penetration therebetween, wherein the pusher bar means comprises:
      i. chain means having an upstream end and a downstream end for traveling in a generally horizontal flight in the downstream direction between the upstream and downstream ends; and
      ii. a plurality of pusher bars attached to the chain means and carried thereby at a linear speed less than the predetermined speed to penetrate the selected adjacent articles in the infeed path proximate the chain means upstream end to thereby form the complements of articles, the pusher bars propelling the complements in the downstream direction between the chain means upstream and downstream ends;
   c. hanger means for supporting the complements of articles as they are propelled in a downstream direction by the pusher bar means; and
   d. conveyor means for delivering the open top containers to rise under respective complements of articles and receive the complements therein.

2. The packer of claim 2 wherein the pusher bar means further comprises:
   a. at least one pivot arm pivotally joined to each pusher bar;
   b. roller means carried by the pivot arm for penetrating between the selected adjacent articles together with the respective pusher bars; and
   c. cam means downstream of the chain means upstream end for pivoting the pivot arm and roller means in the upstream direction relative to the downstream motion of the associated pusher bar and the complement propelled downstream thereby to create a space of predetermined distance between the selected adjacent articles and to temporarily slow the downstream speed of the articles upstream of the cam means.

3. The packer of claim 2 wherein:
   a. the articles have generally cylindrical peripheries; and
   b. the roller means comprises a shaft received in the pivot arm and at least one roller supported on the shaft, the roller having a generally hour glass periphery that conforms to and bears against the peripheries of the selected adjacent articles when the roller means penetrates between the selected adjacent articles.

4. The packer of claim 2 wherein the cam means pivots the pivot arm joined to a first pusher bar to slow the downstream speed of the articles upstream of the cam means in timed relation to the penetration of a second pusher bar upstream of the first pusher bar between the selected adjacent articles.

5. The packer of claim 4 wherein:

a. the second pusher bar travels in a path having vertical and horizontal components of motion as it penetrates between the selected adjacent article; and b. the cam means pivots the pivot arm of the first pusher bar to slow the horizontal speed of the articles upstream of the cam means to a speed generally equal to the horizontal speed of the second pusher bar as it penetrates between the selected adjacent articles, so that the second pusher bar has only generally vertical motion relative to the selected adjacent articles as it penetrates therebetween.

6. Apparatus for loading articles having respective neck flanges into open containers comprising:
   a. first conveyor means traveling at a predetermined speed for feeding a quantity of articles along a downstream path;
   b. pusher bar means for forming and propelling downstream at a speed less than the predetermined speed consecutive complements of the desired number of articles from the quantity thereof, and for temporarily slowing the downstream speed of the articles upstream of a selected complement relative to the predetermined speed, wherein the pusher bar means comprises:
      i. chain means having an upstream end and a downstream end for traveling at a speed less than the predetermined speed along a path generally parallel to the article downstream path between the upstream and downstream ends;
      ii. at least first and second pusher bar assemblies joined to the chain means for traveling therewith and spaced consecutively therealong at an interval corresponding to the number of articles in a complement, the pusher bar assemblies consecutively penetrating between respective first and second sets of adjacent articles in the article path to form respective first and second complements;
   c. hanger means downstream of the first conveyor means for supporting the articles by the respective neck flanges thereof; and
   d. second conveyor means for feeding the open containers in unison with the complements propelled by the pusher bar means to rise under and receive the associated complements.

7. The apparatus of claim 6 wherein each pusher bar assembly comprises:
   a. a pusher bar joined to the chain means and extending across the article path;
   b. at least one pivot arm connected to the pusher bar; and
   c. roller means connected to the pivot arm for pivoting therewith and for bearing against the sets of adjacent articles when the pusher bar assembly penetrates therebetween.

8. The apparatus of claim 7 further comprising cam means for striking and pivoting the pivot arm and roller means on the first pusher bar assembly in an upstream direction relative to the pusher bar of the first pusher bar assembly to slow the speed of the articles upstream therefrom in timed relation to the penetration of the second pusher bar assembly between the second set of adjacent articles.

9. The apparatus of claim 6 wherein:
   a. each pusher bar assembly comprises:
      i. a pusher bar joined to the chain means for traveling therewith and extending across the article path;
      ii. pivot arm means joined to the pusher bar for traveling therewith and pivoting thereabout; and
      iii. roller means joined to the pivot arm means for contacting the sets of adjacent articles when the pusher bar assembly penetrates between the respective sets of adjacent articles and for pivoting with the pivot arm means about the pusher bar; and
   b. the pusher bar means further comprises cam means for striking the pivot arm means of the first pusher bar assembly to pivot the associated roller means in the upstream direction relative to the pusher bar of the first pusher bar assembly to thereby slow the downstream speed of the roller means and the articles upstream thereof to approximately the downstream speed of the pusher bar of the second pusher bar assembly in timed relation to the penetration of the second pusher bar assembly between the second set of adjacent articles.

10. The apparatus of claim 6 wherein the first and second pusher bar assemblies penetrate between to contact and separate the first and second sets of adjacent articles, respectively, in a generally vertical direction relative thereto.

11. The apparatus of claim 6 wherein:
   a. the second pusher bar assembly travels with horizontal and vertical components of motion as it penetrates between to contact and separate the first and second sets of adjacent articles; and
   b. the horizontal speed of the articles upstream of the first pusher bar assembly slows to be generally equal to the speed of the horizontal component of motion of the second pusher bar assembly in timed relation to the penetration thereby of the second set of adjacent articles, so that the second pusher bar assembly penetrates between the second set of adjacent articles with only generally vertical motion relative thereto.

12. Apparatus for forming complements of articles from a quantity thereof comprising:
   a. infeed means for feeding a quantity of articles along a generally horizontal path in a downstream direction at a predetermined speed;
   b. pusher bar means for separating complements of articles from the quantity thereof at a penetration station and for propelling the complements in the downstream direction therefrom at a speed less than the predetermined speed; and
   c. cam means for cooperating with the pusher bar means at a pivot station downstream of the penetration station to temporarily slow the horizontal speed of the articles at the penetration station.

13. The apparatus of claim 12 wherein the pusher bar means comprises:
   a. chain means for traveling in a downstream direction that has vertical and horizontal components of motion at the penetration station and generally horizontal motion downstream from the penetration station; and
   b. a plurality of pusher bar assemblies extending across the article path and consecutively attached to the chain means for consecutively contacting and penetrating between respective selected sets of adjacent articles at the penetration station to form respective consecutive complements from the quantity of articles and for propelling the respective complements in the downstream direction to the pivot station.

14. The apparatus of claim 13 wherein each pusher bar assembly comprises:
   a. a pusher bar attached to the chain means;
   b. pivot arm means connected to the pusher bar for pivoting relative thereto; and
   c. roller means received on the pivot arm means for penetrating between the sets of adjacent articles.

15. The apparatus of claim 14 wherein the roller means, pivot arm means, and pusher bar of each pusher bar assembly are generally vertically aligned at the penetration station as the pusher bar assembly penetrates between a selected set of adjacent articles.

16. The apparatus of claim 14 wherein the roller means, pivot arm means, and pivot bar of each pusher bar assembly are generally vertically aligned between respective selected sets of adjacent articles as the chain means carries the pusher bar assembly downstream from the penetration station to the pivot station.

17. The apparatus of claim 15 wherein the pivot arm means of each pusher bar assembly strikes the cam means at the pivot station to pivot the associated roller means upstream relative to the associated pusher bar and force the articles upstream of the roller means to slow relative to the downstream speed of the chain means to a speed approximately equal to the horizontal component of speed of a pusher bar assembly at the penetration station, so that the pusher bar assembly at the penetration station can penetrate between a selected set of adjacent articles with only generally vertical motion relative thereto.

18. A method of forming complements of articles from a quantity thereof comprising the steps of:
   a. feeding the articles in a downstream direction along an article path at a predetermined speed;
   b. extending a bar having a horizontal longitudinal axis across the article path;
   c. moving the bar to a penetration station along the article path in a direction having components of motion perpendicular to and parallel to the downstream direction while maintaining the bar longitudinal axis horizontal, wherein the step of moving a bar to a penetration station comprises the step of providing at least first and second bars consecutively spaced apart along the article path, the first and second bars propelling respective consecutive complements in the downstream direction from the penetration station at a speed less than the predetermined speed;
   d. temporarily slowing the downstream speed of the articles at the penetration station to a speed less than the predetermined speed;
   e. inserting the bar between selected adjacent articles at the penetration station in timed relation with the slowed downstream speed of the articles to contact the selected adjacent articles and form a complement downstream of the bar; and
   f. propelling the complement downstream from the penetration station with the bar, wherein the step of temporarily slowing the downstream speed of the articles comprises the steps of:
      i. moving the first bar at the pivot station downstream of the penetration station;
      ii. pivoting the first bar at the pivot station to create a leading edge thereof that continues in the downstream direction at a speed less than the predetermined speed and a trailing edge that pivots in the upstream direction relative to the leading edge; and
      iii. forcing the pivoting first bar trailing edge against the articles upstream therefrom and forcing the articles upstream of the first bar to slow relative to the predetermined speed.

19. The method of claim 18 wherein the step of inserting the bar between selected adjacent articles comprises the step of inserting the first and second bars consecutively between respective selected adjacent articles at the penetration station to form respective complements downstream of the respective bars.

* * * * *

UNITED STATES PATENT AND TRADEMARK OFFICE
CERTIFICATE OF CORRECTION

PATENT NO. : 4,998,399

DATED : March 12, 1991

INVENTOR(S) : Wayne S. Lutzke, et al

It is certified that error appears in the above-identified patent and that said Letters Patent is hereby corrected as shown below:

Column 8, line 36:
    Change the claim dependency to read --claim 1--.

Column 8, line 38:
    Delete "pivotally".

Signed and Sealed this

Eighth Day of September, 1992

Attest:

DOUGLAS B. COMER

*Attesting Officer*    *Acting Commissioner of Patents and Trademarks*